(12) United States Patent
Zohar et al.

(10) Patent No.: US 7,565,569 B2
(45) Date of Patent: Jul. 21, 2009

(54) DATA PROTECTION IN A MASS STORAGE SYSTEM

(75) Inventors: Ofir Zohar, Alfe-Menashe (IL); Yaron Revah, Tel-Aviv (IL); Haim Helman, Ramat Gan (IL); Dror Cohen, Tel Aviv (IL); Shemer Schwartz, Herzelia (IL)

(73) Assignee: International Business Machines Corporation, Armonk, NY (US)

( * ) Notice: Subject to any disclaimer, the term of this patent is extended or adjusted under 35 U.S.C. 154(b) by 514 days.

(21) Appl. No.: 11/080,328

(22) Filed: Mar. 15, 2005

(65) Prior Publication Data

US 2006/0107097 A1 May 18, 2006

Related U.S. Application Data

(60) Provisional application No. 60/620,697, filed on Oct. 22, 2004.

(51) Int. Cl.
G06F 11/00 (2006.01)
(52) U.S. Cl. .............. 714/6; 711/112; 711/114
(58) Field of Classification Search ............ 714/6
See application file for complete search history.

(56) References Cited

U.S. PATENT DOCUMENTS 5,524,204 A * 6/1996 Verdoorn, Jr. ............ 714/6
5,875,457 A * 2/1999 Shalit .................. 711/114
6,058,489 A * 5/2000 Schultz et al. ............ 714/7
6,079,029 A * 6/2000 Iwatani et al. ............ 714/6
6,484,269 B1 11/2002 Kopylovitz et al.
6,754,773 B2 * 6/2004 Ulrich et al. ............ 711/118
6,871,317 B1 * 3/2005 Corbett .................. 714/800
6,941,420 B2 * 9/2005 Butterworth et al. ...... 711/114
7,096,328 B2 * 8/2006 Yao et al. ................ 711/157
7,356,757 B2 * 4/2008 Chen .................... 714/800
2005/0132134 A1 * 6/2005 Chien .................... 711/114
2006/0075290 A1 * 4/2006 Hartline et al. ............ 714/6
2008/0276041 A1 * 11/2008 Hetzler .................. 711/114

OTHER PUBLICATIONS

Hong Tang and Tao Yang: *Differentiated Object Placement and Location for Self-Organizing Storage Clusters*—Technical Report 2002-32, UCSB, Nov. 2002. In Submission to USENIX Annual Technical Conference, 2003.

David Karger, Eric Lehman, Tom Leighton, Rina Panigrahy, Matthew Levine, Daniel Lewin: *Consistent Hashing and Random Trees: Distributed Caching Protocols for Relieving Hot Spots on the World Wide Web.*

* cited by examiner

*Primary Examiner*—Emerson C Puente
(74) *Attorney, Agent, or Firm*—Griffiths & Seaton PLLC (57) ABSTRACT

A method for distributing data over a set of N storage devices. The method includes apportioning the data into groups of (N−2) or fewer blocks, and adding to each group a parity block so as to form a parity set. The method further includes distributing the blocks of each parity set to the N storage devices so that each of the blocks is stored on a different storage device.

6 Claims, 10 Drawing Sheets

| INITIAL SET DISTRIBUTION | | | | | | RANDOM NUMBER | DISTRIBUTION TO NEW DEVICE |
|---|---|---|---|---|---|---|---|
| PS | D1 | D2 | D3 | D4 | D5 | | |
| 1 | B0 | B1 | B2 | P | | 3 | B2 |
| 2 | B4 | B5 | P | | B3 | 1 | B4 |
| 3 | B8 | P | | B6 | B7 | 2 | P |
| 4 | P | | B9 | B10 | B11 | 2 | |
| 5 | | B12 | B13 | B14 | P | 4 | B14 |
| 6 | B15 | B16 | B17 | P | | 3 | B17 |
| 7 | B19 | B20 | P | | B18 | 4 | |
| 8 | B23 | P | | B21 | B22 | 5 | B22 |
| ~ | ~ | ~ | ~ | ~ | ~ | ~ | ~ |
| 771 | | B2310 | B2311 | P | B2312 | 3 | B2311 |
| 772 | B2313 | B2314 | P | B2315 | | 1 | B2313 |
| 773 | B2317 | P | B2318 | | B2316 | 4 | |
| 774 | P | B2321 | | B2319 | B2320 | 1 | P |

Table 30:

| D1 | D2 | D3 | D4 | D5 |
|---|---|---|---|---|
| B0 | B1 | B2 | P(0,1,2) | B3 |
| B4 | B5 | P(3,4,5) | B6 | B7 |
| B8 | P(6,7,8) | B9 | B10 | B11 |
| P(9,10,11) | B12 | B13 | B14 | P(12,13,14) |
| B15 | B16 | B17 | P(15,16,17) | B18 |
| B19 | B20 | P(18,19,20) | B21 | B22 |
| B23 | P(21,22,23) | ~ | ~ | ~ |
| ~ | ~ | B2311 | P(2310,....) | B2312 |
|  | B2310 |  |  |  |
| B2313 | B2314 | P(2313,...) | B2315 | B2316 |
| B2317 | P(2316,...) | B2318 | B2319 | B2320 |
| P(2319,...) | B2321 |  |  |  |
|  |  |  |  |  |

Table 50:

| D1 | D2 | D3 | D4 | D5 | D6 |
|---|---|---|---|---|---|
| B0 | B1 | — | P(0,1,2) | B3 | B2 |
| — | B5 | P(3,4,5) | B6 | B7 | B4 |
| B8 | — | B9 | B10 | B11 | P(6,7,8) |
| P(9,10,11) | B12 | B13 | — | P(12,13,14) | B14 |
| B15 | B16 | — | P(15,16,17) | B18 | B18 |
| B19 | B20 | P(18,19,20) | B21 | — | B22 |
| B23 | — | ~ | ~ | ~ | ~ |
| ~ | ~ | — | P(2310,....) | B2312 | B2311 |
|  | B2310 |  |  |  |  |
| B2313 | B2314 | P(2313,...) | B2315 | B2316 |  |
| B2317 | — | B2318 | B2319 | B2320 | P(2316....) |
| P(2319,...) | B2321 |  |  |  |  |
|  |  |  |  |  |  |

| PS | D1 | D2 | D3 | D4 | D5 | RANDOM NUMBER | DISTRIBUTION TO NEW DEVICE |
|---|---|---|---|---|---|---|---|
| | | | INITIAL SET DISTRIBUTION | | | | |
| 1 | B0 | B1 | B2 | P | | 3 | B2 |
| 2 | B4 | B5 | P | | B3 | 1 | B4 |
| 3 | B8 | P | | B6 | B7 | 2 | P |
| 4 | P | | B9 | B10 | B11 | 2 | |
| 5 | | B12 | B13 | B14 | P | 4 | B14 |
| 6 | B15 | B16 | B17 | P | B18 | 3 | B17 |
| 7 | B19 | B20 | P | | B22 | 4 | |
| 8 | B23 | P | | B21 | B22 | 5 | B22 |
| ? | ? | P | ? | ? | ? | ? | ? |
| 771 | | B2310 | B2311 | P | B2312 | 3 | B2311 |
| 772 | B2313 | B2314 | P | B2315 | | 1 | B2313 |
| 773 | B2317 | P | B2318 | | B2316 | 4 | |
| 774 | P | B2321 | | B2319 | B2320 | 1 | P |

| LAYOUT OF INITIAL SET | | | | | | |
|---|---|---|---|---|---|---|
| PS | D1 | D2 | D3 | D4 | D5 | D6 |
| 1 | B0 | B1 | | P | | B2 |
| 2 | | B5 | P | | B3 | B4 |
| 3 | B8 | | | B6 | B7 | P |
| 4 | P | | B9 | B10 | B11 | |
| 5 | | B12 | B13 | | P | B14 |
| 6 | B15 | B16 | | P | | B17 |
| 7 | B19 | B20 | P | | B18 | |
| 8 | B23 | P | | B21 | | B22 |
| ~ | ~ | ~ | ~ | ~ | ~ | ~ |
| 771 | | B2310 | | P | B2312 | B2311 |
| 772 | | B2314 | P | B2315 | | B2313 |
| 773 | B2317 | P | B2318 | | B2316 | |
| 774 | | B2321 | | B2319 | B2320 | P |
| | | | | | | |

80

| UPON FAILURE OR REMOVAL OF A DEVICE | | | | | | | |
|---|---|---|---|---|---|---|---|
| PS | D1 | D2 | D3 | D4 | D5 | D6 | RANDOM NUMBER |
| 1 | B0 | B1 | | P | | X | 3 |
| 2 | | B5 | P | | B3 | X | 4 |
| 3 | B8 | | | B6 | B7 | X | 2 |
| 4 | P | | B9 | B10 | B11 | X | |
| 5 | | B12 | B13 | | P | X | 4 |
| 6 | B15 | B16 | | P | | X | 3 |
| 7 | B19 | B20 | P | | B18 | X | 4 |
| 8 | B23 | P | | B21 | | X | 5 |
| ~ | ~ | ~ | ~ | ~ | ~ | X | ~ |
| 771 | | B2310 | | P | B2312 | X | 1 |
| 772 | | B2314 | P | B2315 | | X | 1 |
| 773 | B2317 | P | B2318 | | B2316 | X | |
| 774 | | B2321 | | B2319 | B2320 | X | 3 |
| | | | | | | X | |

| PS | LAYOUT OF DEPLETED SET | | | | | |
|---|---|---|---|---|---|---|
| | D1 | D2 | D3 | D4 | D5 | D6 |
| 1 | B0 | B1 | B2 | P | | X |
| 2 | | B5 | P | B4 | B3 | X |
| 3 | B8 | P | | B6 | B7 | X |
| 4 | P | | B9 | B10 | B11 | X |
| 5 | | B12 | B13 | B14 | P | X |
| 6 | B15 | B16 | B17 | P | | X |
| 7 | B19 | B20 | P | | B18 | X |
| 8 | B23 | P | | B21 | B22 | X |
| ~ | ~ | ~ | ~ | ~ | ~ | X |
| 771 | B2311 | B2310 | | P | B2312 | X |
| 772 | B2313 | B2314 | P | B2315 | | X |
| 773 | B2317 | P | B2318 | | B2316 | X |
| 774 | | B2321 | P | B2319 | B2320 | X |
| | — | — | — | — | — | X |

DATA PROTECTION IN A MASS STORAGE SYSTEM

CROSS-REFERENCE TO RELATED APPLICATION

This application claims the benefit of U.S. Provisional Patent Application No. 60/620,697, filed Oct. 22, 2004, which is incorporated herein by reference.

FIELD OF THE INVENTION

The present invention relates generally to methods and apparatus for data storage. More particularly, the present invention relates to a method and apparatus for the distribution and protection of data in a mass storage system.

BACKGROUND OF THE INVENTION

Data protection is a critical issue in mass storage systems, especially high-end data storage systems meant to handle mission critical data. One way to protect data in a storage system is by maintaining a mirror copy of all data stored in the system. However, because of the high cost of such a level of protection, alternate protection schemes have been developed in the art. These approaches are usually classified as various levels of RAID (Redundant Array of Independent Disks). RAID levels were first defined in an article by Patterson, et. al, "A Case for Redundant Arrays of Inexpensive Disks," University of Berkeley (1988). Enhancements to these levels are described in "The RAIDbook, A Source Book For Disk Array Technology," Paul Massiglia, The RAID Advisory Board (6th Ed., 1999). In general, the RAID storage schemes utilize multiple storage devices so as to provide a means for protecting data while also balancing the load on the storage devices.

The RAID 5 scheme is generally considered a cost-effective method for protecting data while balancing the device load. Under the RAID 5 scheme, N disk drives form a RAID storage unit, where N is a positive integer. Data is grouped into sequences of (N−1) blocks, or portions, of data, and a corresponding parity block is calculated by XOR-ing the (N−1) data blocks. The (N−1) related data blocks and the corresponding parity block are distributed across the N drives as a group in such a manner that each block is stored on a different disk. Furthermore, parity blocks are not concentrated on one drive, but are evenly distributed among the drives, so that no single drive becomes a potential bottleneck.

The minimum number of disk drives in a RAID 5 storage unit is three, but it is common to use five or more drives. RAID 5 implementations provide balanced data storage and protection against single disk failure at a much lower cost than the scheme of mirroring all data. Whereas mirroring all data requires doubling the storage capacity, RAID 5 commonly requires an increase of 20% or less (corresponding to N equal to 5 or more) in the storage capacity.

A drawback to RAID 5 implementations is that they are only partly scalable, since a RAID 5 implementation comprising four disks may only increase its capacity by adding another four disks.

An article titled "Consistent Hashing and Random Trees: Distributed Caching Protocols for Relieving Hot Spots on the World Wide Web," by Karger et al., in the *Proceedings of the 29th ACM Symposium on Theory of Computing*, pages 654-663, (May 1997), whose disclosure is incorporated herein by reference, describes a technique of consistent hashing, and the use of a consistent hashing function. Such a function allocates objects to devices so as to spread the objects evenly over the devices, so that there is a minimal redistribution of objects if there is a change in the devices, and so that the allocation is consistent, i.e., is reproducible. The article applies a consistent hashing function to read-only cache systems, i.e., systems where a client may only read data from the cache system, not write data to the system, in order to distribute input/output requests to the systems.

An article titled "Differentiated Object Placement and Location for Self-Organizing Storage Clusters," by Tang et al., in *Technical Report* 2002-32 of the University of California, Santa Barbara (November, 2002), whose disclosure is incorporated herein by reference, describes a protocol for managing a storage system where components are added or removed from the system. The protocol uses a consistent hashing scheme for placement of small objects in the system.

U.S. Pat. No. 6,484,269 to Kopylovitz, whose disclosure is incorporated herein by reference, describes a data storage system for receiving data to be stored on at least one data storage device. The data storage system comprises a central controller and a plurality of data storage devices connected to the central controller, each device including a data integrity value generator and a data storage element.

SUMMARY OF THE INVENTION

Embodiments of the present invention provide efficient methods and apparatus for distributing and protecting data in a mass storage system.

In embodiments of the present invention, a mass storage system comprises three or more data storage devices. For N data storage devices, where N is a positive integer greater than two, data blocks to be stored in the storage system are formed into groups of (N−2) or fewer data blocks, and a parity block is generated for each group. The parity block and its associated data blocks constitute the blocks of a parity set. Blocks of a parity set are distributed among the storage devices so that no two blocks of the set are assigned to the same data storage device. The method of distribution typically provides a balanced distribution of the data and parity blocks across the N storage devices. In addition, the method of distribution allows for scalability of the system at the single device level, i.e., when a single storage device is added to or removed from the system.

In an embodiment of the present invention, a data distribution procedure ensures that, after adding one or more data storage devices, the data and parity blocks are redistributed and the new distribution of data is balanced.

In the event of removal or failure of one of the data storage devices, the system may reconstruct each lost data or parity block by XOR-ing the remaining blocks of the associated parity set. In further embodiments of the present invention, procedures for data distribution may also be implemented after a data storage device is removed in order to provide a balanced distribution of data, including the reconstructed data, across the remaining storage devices.

There is therefore provided, in accordance with an embodiment of the present invention, a method for distributing data over a set of N storage devices, N being an integer greater than two, including:

apportioning the data into one or more groups, each group consisting of one to (N−2) blocks of data;

for each group, calculating a parity block, so as to form a parity set comprising the one to (N−2) blocks of data and the parity block; and for each parity set, distributing the blocks included therein to the N storage devices so that each of the blocks is stored on a different storage device.

Typically, the blocks in each parity set are distributed so that there is a balanced distribution of the blocks across the devices.

Distributing the data may further include:

adding one or more storage devices to the N storage devices, thus forming an extended set of the storage devices;

redistributing the blocks among the storage devices in the extended set so as to cause a portion of the blocks stored on the N devices to be redistributed to the one or more additional storage devices, while maintaining the balanced distribution and while ensuring that for each parity set the blocks included therein are each stored on a different storage device of the extended set, and without requiring a substantial transfer of blocks between the storage devices in the N devices.

Redistributing the blocks may include applying a consistent hashing function to determine the blocks that will be redistributed from the set of N storage devices to the extended set.

Alternatively or additionally, redistributing the blocks may include implementing a randomizing process to determine the blocks that will be redistributed from the set of N storage devices to the extended set.

Distributing the data may further include:

removing a surplus device from the N storage devices, thus forming a depleted set of storage devices;

for each block on the surplus device, reconstructing the block by XOR-ing remaining blocks of the parity set of the block, so as to form a reconstructed block;

redistributing the reconstructed blocks among the storage devices in the depleted set so as to cause the reconstructed blocks to be reallocated to the depleted set, while maintaining the balanced distribution and while ensuring that for each parity set the blocks included therein are each stored on a different storage device of the depleted set, and without requiring a substantial transfer of blocks among the storage devices in the depleted set.

Redistributing the reconstructed blocks may include applying a consistent hashing function to distribute the reconstructed blocks to the depleted set.

Alternatively or additionally, redistributing the reconstructed blocks may include implementing a randomizing process to distribute the reconstructed blocks to the depleted set.

There is further provided, in accordance with an embodiment of the present invention, apparatus for distributing data over a set of N storage devices, N being an integer greater than two, the apparatus including:

a processing unit, which is adapted to:

apportion the data into one or more groups, each group consisting of one to (N−2) blocks of data, for each group, calculate a parity block, so as to form a parity set including the one to (N−2) blocks of data and the parity block, and for each parity set, distribute the blocks included therein to the N storage devices so that each of the blocks is stored on a different storage device.

Typically, the processing unit is adapted to distribute the blocks included in each parity set so that there is a balanced distribution of the blocks across the devices.

In a further embodiment of the invention, one or more additional storage devices are added to the N storage devices to form an extended set of storage devices, and the processing unit is adapted to:

redistribute the blocks of each parity set among the extended set so as to cause a portion of the blocks stored on the N devices to be redistributed to the one or more additional storage devices, while maintaining the balanced distribution and while ensuring that for each parity set the blocks included therein are each stored on a different storage device of the extended set, and without requiring a substantial transfer of blocks between the storage devices in the N devices.

The processing unit may be further adapted to redistribute the blocks by applying a consistent hashing function to determine the blocks that will be redistributed from the set of N storage devices to the extended set.

Alternatively or additionally, the processing unit may be adapted to redistribute the blocks by implementing a randomizing process to determine the blocks that will be redistributed from the set of N storage devices to the extended set.

In a further embodiment of the invention, a surplus device is removed from the N storage devices, thus forming a depleted set of storage devices, and the processing unit is adapted to:

reconstruct each block of the surplus device by XOR-ing remaining blocks of the parity set of each block, so as to form reconstructed blocks, and redistribute the reconstructed blocks among the storage devices in the depleted set so as to cause the reconstructed blocks to be reallocated to the depleted set, while maintaining the balanced distribution and while ensuring that for each parity set the blocks included therein are each stored on a different storage device of the depleted set, and without requiring a substantial transfer of blocks among the storage devices in the depleted set.

The processing unit may be further adapted to redistribute the reconstructed blocks by applying a consistent hashing function to distribute the reconstructed blocks to the depleted set.

Alternatively or additionally, the processing unit may be adapted to redistribute the reconstructed blocks by implementing a randomizing process to distribute the reconstructed blocks to the depleted set.

The present invention will be more fully understood from the following detailed description of the embodiments thereof, taken together with the drawings in which:

DETAILED DESCRIPTION OF EMBODIMENTS

Figure 1:
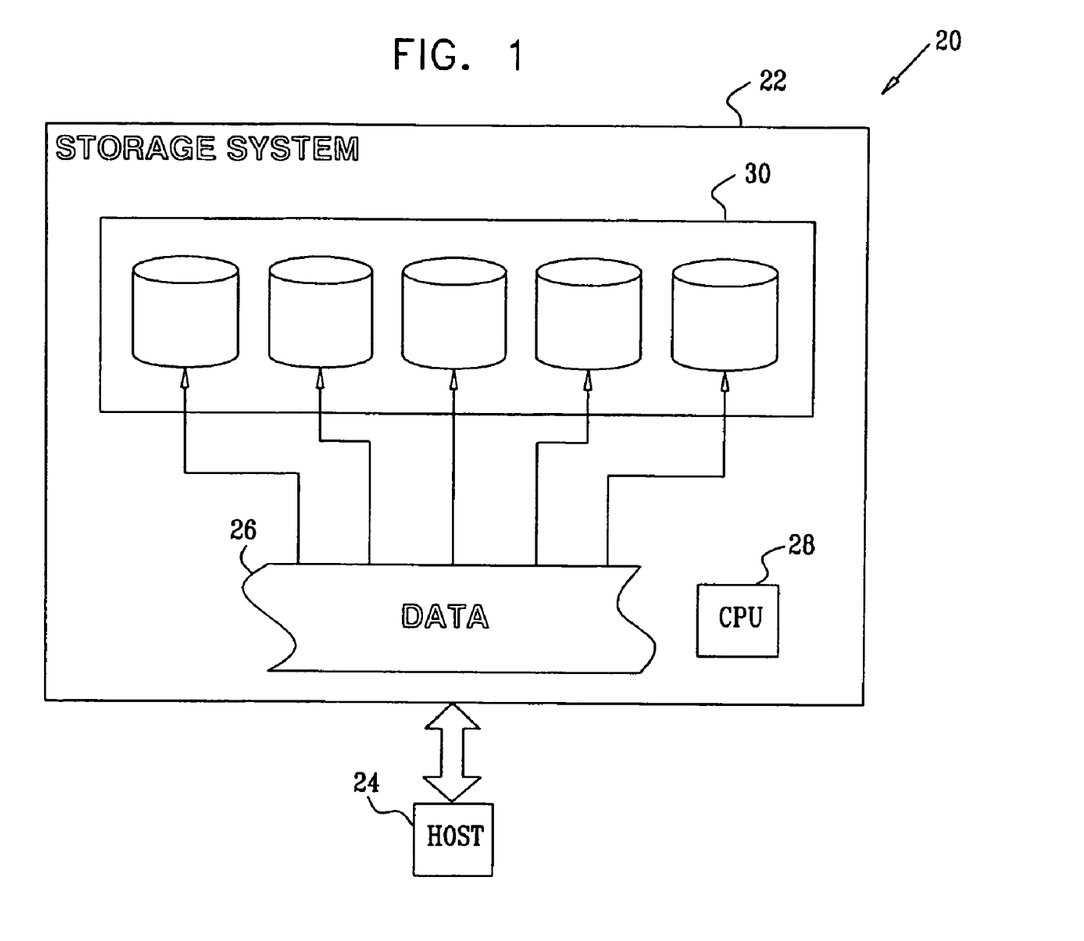
FIG. 1 is a diagram of a data processing network, in accordance with an embodiment of the present invention.

Reference is now made to FIG. 1, which illustrates a data processing network 20, in accordance with an embodiment of the present invention. Network 20 comprises a data storage system 22 and a host 24. System 22 comprises a processing unit 28 which manages operations of the system. Processing unit 28 may comprise one or more processing units and/or central processing units (CPUs), which may typically be distributed. Herein, by way of example, processing unit 28 is assumed to be one CPU, referred to hereinbelow as CPU 28. System 22 also comprises N storage devices 30, where N is a positive integer greater than or equal to three. Storage devices 30 may be magnetic disk drives, or solid-state, random access memory (RAM) disks, or any other devices used for storing non-volatile data, or any combination of such devices. Storage devices 30 are typically controlled by one or more controllers.

Host 24 communicates with system 22 in order to read data from, or write data to, the system. For example, host 24 sends data 26 to be written to and distributed over storage devices 30. CPU 28 forms the data into one or more groups, each group consisting of (N−2) or fewer data blocks. The data blocks of each group are formed to be equal in size, if necessary by CPU 28 padding a block or blocks of the group with zeros or null characters.

CPU 28 further adds to each group a parity block, calculated by XOR-ing the blocks of data in the group. The data blocks, together with the parity block, constitute a parity set. Parity sets thus contain G blocks, where G is (N−1) or less.

By way of example, data storage devices 30 are herein assumed to comprise five data storage devices, i.e., N=5, and G may be 2, 3, or 4. The devices are assumed to have equal capacities. Those skilled in the art will be able to adapt the explanation below, mutatis mutandis, for other permitted values of N, and for storage devices having different sizes.

Figure 2:
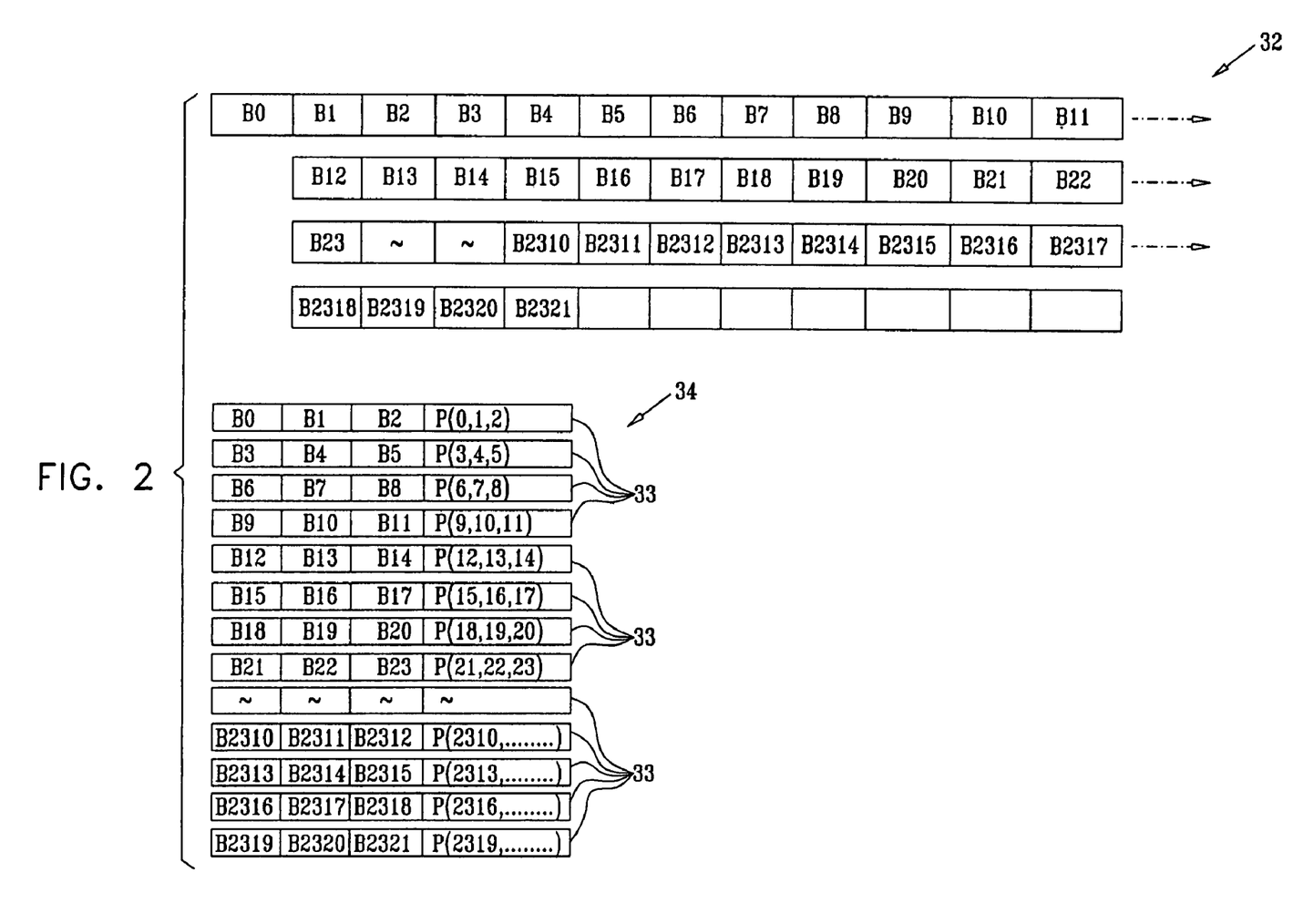
FIG. 2 is a diagram showing data and parity blocks that are to be stored by a data storage system of FIG. 1, in accordance with an embodiment of the present invention.

FIG. 2 shows data blocks, parity blocks, and parity sets stored by data processing system 22, in accordance with an embodiment of the present invention. A table 32 shows data blocks B0, B1, . . . , B2320, B2321, . . . with the symbol "~" indicating the blocks that are not explicitly listed. A table 34 shows parity sets 33 calculated by CPU 28, based on the data of table 32, assuming that G=4, i.e., a parity block is calculated for every three data blocks. By way of example, CPU 28 groups together data blocks, B0, B1, and B2, calculates a parity block, P(0,1,2), from these data blocks, and forms a parity set {B0,B1,B2,P(0,1,2)} from the parity and data blocks.

CPU 28 forms remaining parity sets {B·3n,B·(3n+1),B·(3n+2),P(3n,3n+1,3n+2),n>0,n∈I} in a similar manner.

Figure 3:
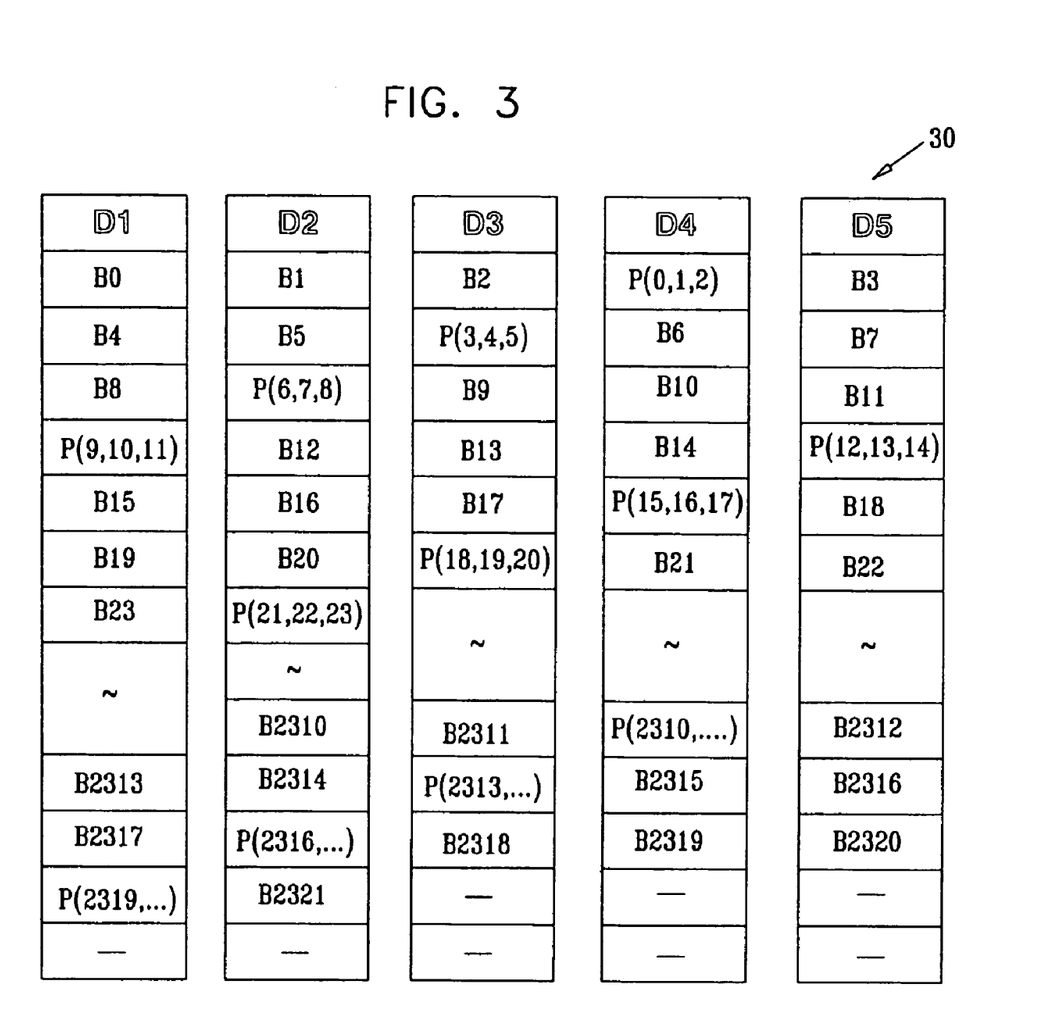
FIG. 3 is a schematic diagram illustrating a distribution of the data and parity blocks to storage devices in the storage system of FIG. 1, in accordance with an embodiment of the present invention.

FIG. 3 is a schematic diagram illustrating the distribution of parity sets to storage devices 30, in accordance with an embodiment of the present invention. For clarity, devices 30 have been numbered D1, D2, D3, D4, D5. By way of example, the blocks of first parity set 33 are assigned to devices D1, D2, D3, and D4, respectively, and the blocks of subsequent parity sets are written in such a manner as to create a balanced distribution. Balanced distribution is herein taken to mean that for K×N or more data transactions with storage system 22, the fraction of capacities used for each of the N device is equal to within approximately p percent, where K and p may be defined by a user of system 22. Typically, K may be of the order of 10,000, and p may be of the order of 1.

Advantageously, blocks are spread across storage devices 30 such that the spare capacity of each device is approximately equal, and so as to obtain a balanced distribution. Balanced distribution improves performance by reducing the load on any one device. In addition, balanced distribution provides an efficient utilization of the total storage capacity. As further shown in the diagram, parity blocks are also typically distributed substantially evenly across all storage devices 30, mitigating the potential for input/output (I/O) bottlenecks. Alternatively, data and/or parity blocks may be spread across devices 30 in at least a partially unbalanced distribution.

Figure 4:
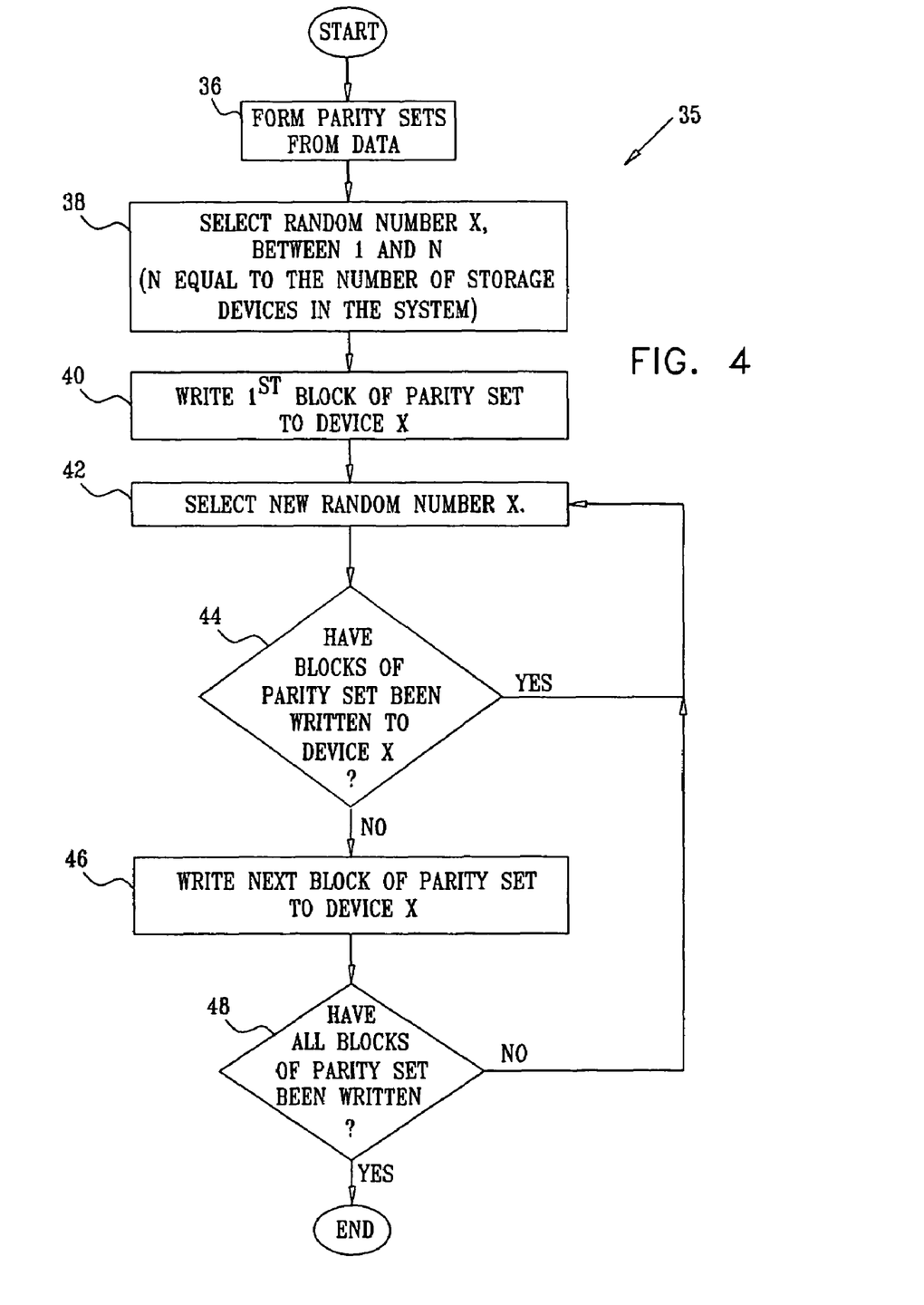
FIG. 4 is a flowchart of a process used to generate the distribution of FIG. 3, in accordance with an embodiment of the present invention.

FIG. 4 is a flowchart of a process 35 used to generate the data distribution of FIG. 3, in accordance with an embodiment of the present invention. CPU 28 uses process 35 to distribute blocks of a parity set across the storage devices through a randomizing distribution process that determines which devices will be "skipped" by the given parity set. In a first step 36, CPU 28 forms parity sets 33, as described above with reference to FIG. 1 and FIG. 2. After the parity sets are formed in step 36, a random number, x, between 1 and N is generated in a step 38, N being the number of storage devices in the system. In a step 40, the first block of the parity set is written to device number x. In a step 42, a new random number between 1 and N is generated, determining the device to which the next block of the parity set is written. If the device has already been used, as ascertained by a decision step 44, then CPU 28 repeats steps 42 and 44 until a random number corresponding to an unused device is selected. After the selection of each unused device, a block of the parity set is written to this device, in a step 46. This iterative process continues until all blocks of the parity set have been written, as ascertained by a step 48, after which process 35 concludes for the parity set. CPU 28 applies process 35 to all the parity sets to be stored on devices 30.

In a further embodiment of the present invention, the randomizing distribution process uses a consistent hashing function such as that described in US Patent Application Number 2005001556 to Zohar et al, titled "Data Allocation in a Distributed Storage System," which is assigned to the assignee of the present invention and which is incorporated herein by reference. In the process using the hashing function, semi-random numbers are generated once for the system, and the same hashing function and process are subsequently used for the distribution of data when devices are added to and/or removed from the storage system.

Figure 5:
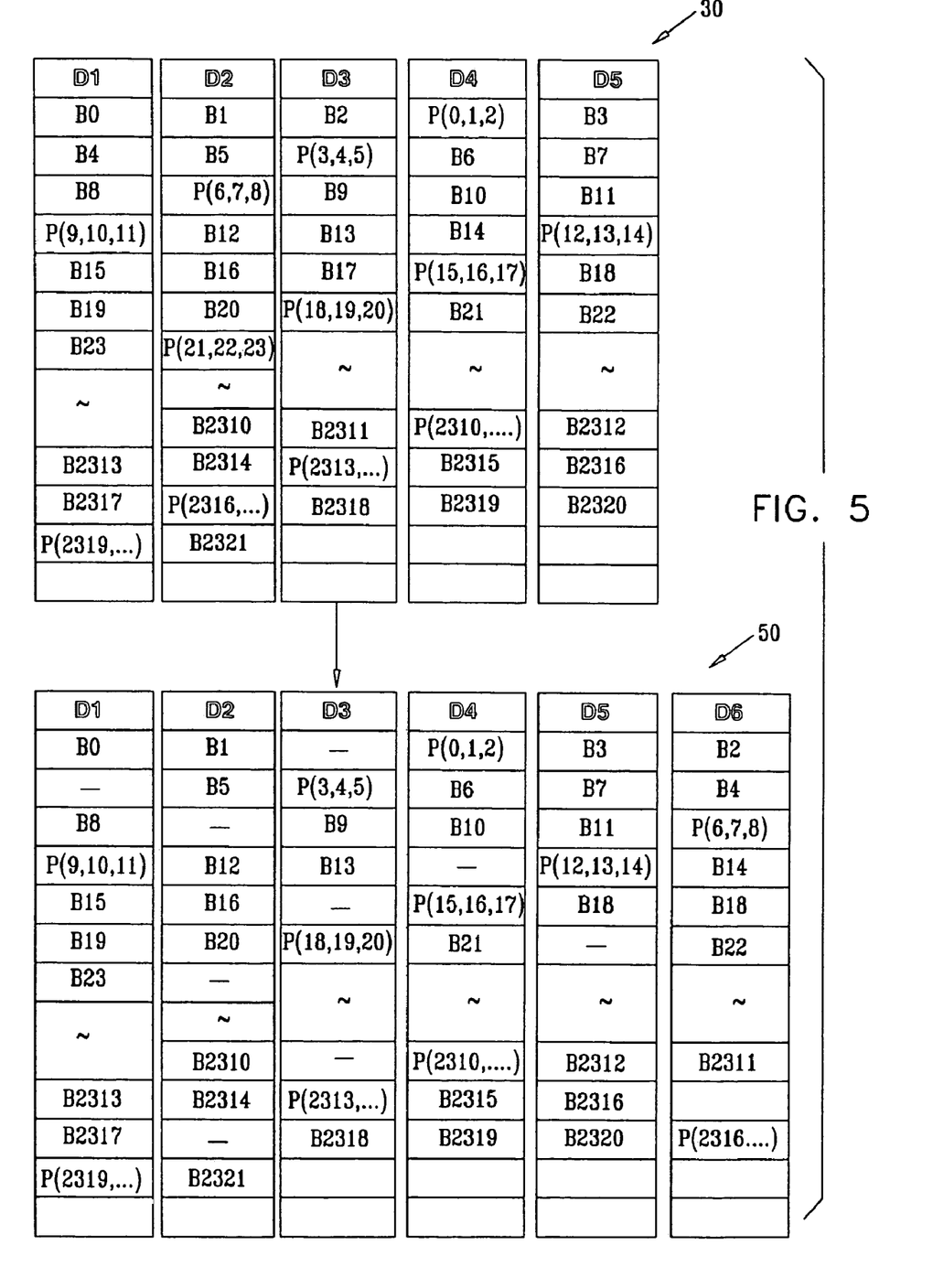
FIG. 5 is a schematic diagram illustrating a redistribution of data blocks when a storage device is added to the storage system of FIG. 1, in accordance with an embodiment of the present invention.

FIG. 5 is a schematic diagram illustrating redistribution of data and parity blocks when a storage device is added to storage system 22, in accordance with an embodiment of the present invention. As shown in FIG. 5, storage devices 30 become an extended set 50 comprising (N+1) storage devices, and CPU 28 moves data blocks to the new storage device, indicated as D6, in such a manner that the used space of all the devices, included D6, is balanced. Also, CPU 28 tracks the parity sets to ensure that no two blocks in the same set are assigned to D6. In the diagram, the symbol "-" is used to indicate blank physical locations from which data blocks have been moved. The redistribution is described in more detail with respect to FIGS. 6 and 7 below.

Figure 6:
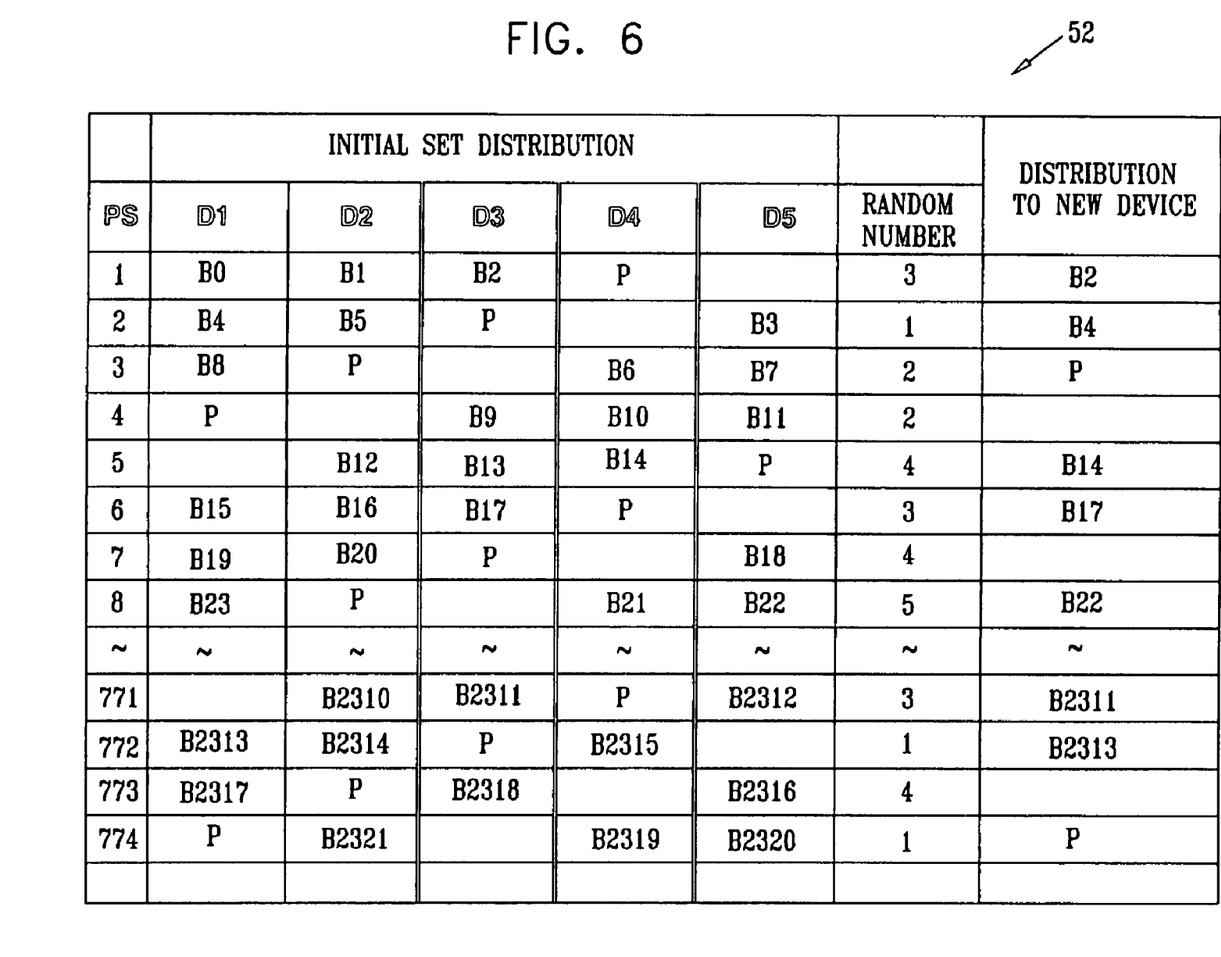
FIG. 6 is a table illustrating a randomizing process used for the redistribution illustrated in FIG. 5, in accordance with an embodiment of the present invention.

FIG. 6 shows a table 52 that illustrates operation of a randomizing distribution process used to generate extended set 50, in accordance with an embodiment of the present invention. The randomizing process is described in more detail below with respect to FIG. 7. In Table 52, a column PS numbers the parity sets stored on devices 30, and parity sets are also referred to hereinbelow as PSn, where n is a positive integer. The columns "Initial Set Distribution" show the distribution of the parity sets in storage devices 30 according to FIG. 5. The column "Distribution to New Device" shows the parity set block to be reallocated to device D6 by the randomizing distribution process.

Figure 7:
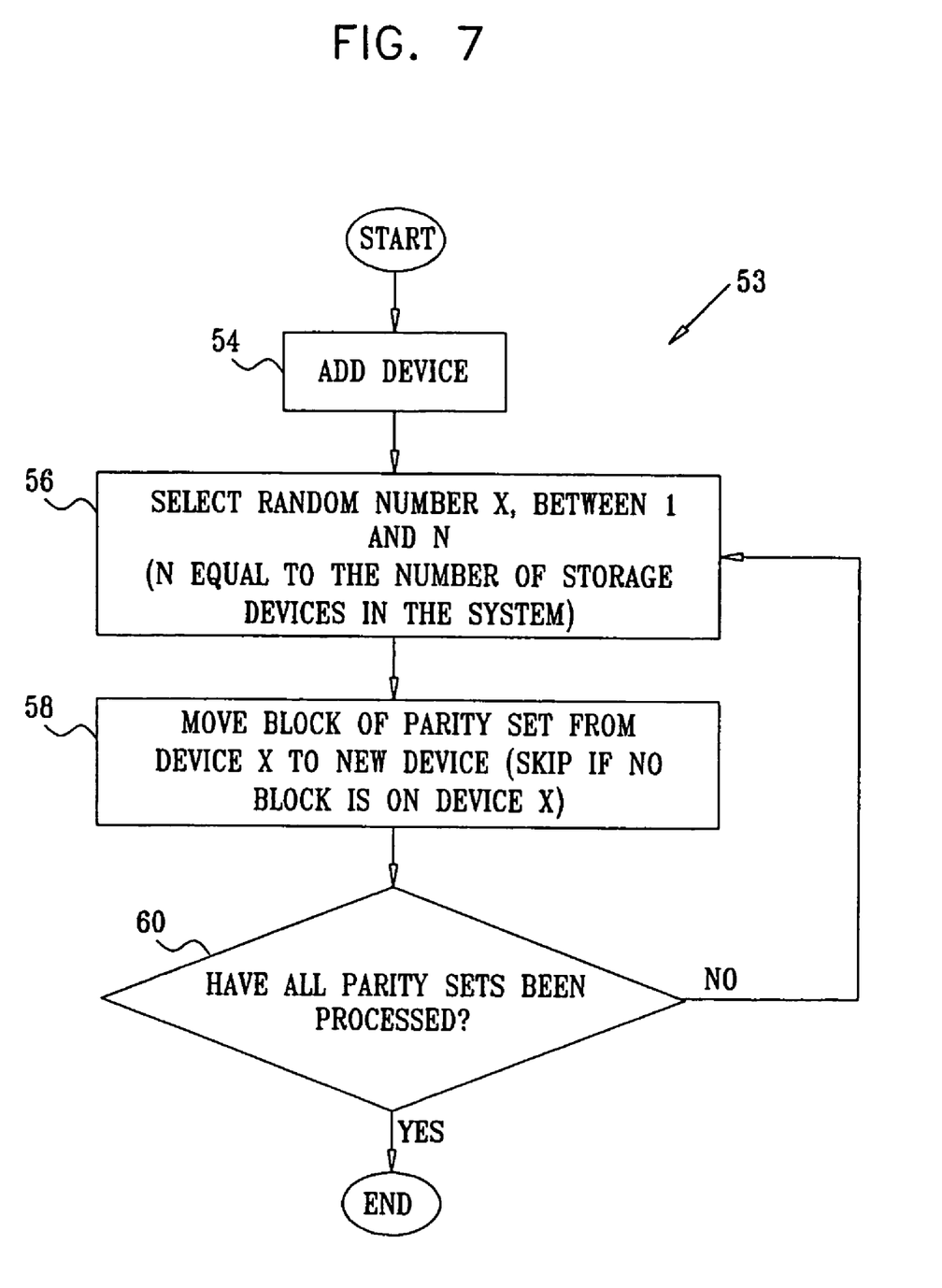
FIG. 7 is a flowchart of the randomizing process used for the redistribution illustrated in FIGS. 5 and 6, in accordance with an embodiment of the present invention.

FIG. 7 is a flowchart of a randomizing process 53 used for the redistribution illustrated in FIGS. 5 and 6, in accordance with an embodiment of the present invention.

In the process each parity set existing on devices D1-D5 is processed individually. In a first step 54, device D6 is added to system 22. For each parity set on devices D1-D5, a random number, between 1 and N, is generated in a step 56. If the number represents an initial device to which a block of the parity set is assigned, then this block is moved from the initial device to the new device D6 in a step 58. If the random number represents a device that contained no blocks of the parity set, then no block is moved. In the example illustrated in table 52, the random number generated for parity set 1 (PS1) is 3, and, therefore, block B2 (which was assigned to D3) is moved to D6. For PS4, the random number generated is 2, but no block of PS4 is assigned to device D2, and therefore no blocks are moved. As indicated by a step 60, process 53 continues iteratively until all parity sets have been processed, at which point the process completes.

If two or more devices are added to storage devices 30, then process 53 is repeated for each device. Thus, for two additional devices, distribution to the first added storage device proceeds according to process 53, and then process 53 is repeated for the second storage device, with step 56 now comprising the generation of a random number between 1 and (N+1), where the first added storage device is now the (N+1) device. In another embodiment of the present invention, the randomizing selection of step 56 is recorded in step 58, but blocks are physically moved only after process 53 has been performed for all new devices. This approach avoids the inefficiency of moving some blocks to a first new device and then, subsequently, to a second new device. In yet another embodiment, process 53 uses a consistent hashing function, such as that referred to above. As described in US Patent Application Number 2005001556, use of the consistent hashing function enables blocks that have been distributed to the additional device to be redistributed to their original devices if the additional device is subsequently removed, assuming the redistribution is performed using the same hashing function.

From consideration of process 53 (FIG. 7), and by inspection of the exemplary results of the process shown in FIGS. 5 and 6, it will be appreciated that on addition of a storage device to an initial set of storage devices process 53 causes substantially no transfer of data between devices of the initial set. Process 53 only causes data movement to the additional storage device.

Following redistribution of the data and parity blocks, the percentage of free space on each of the devices of the extended set is approximately the percentage of free space on the devices before the addition, multiplied by a factor, $$\frac{N+x}{N},$$

where x is the number of new devices added.

Figure 8:
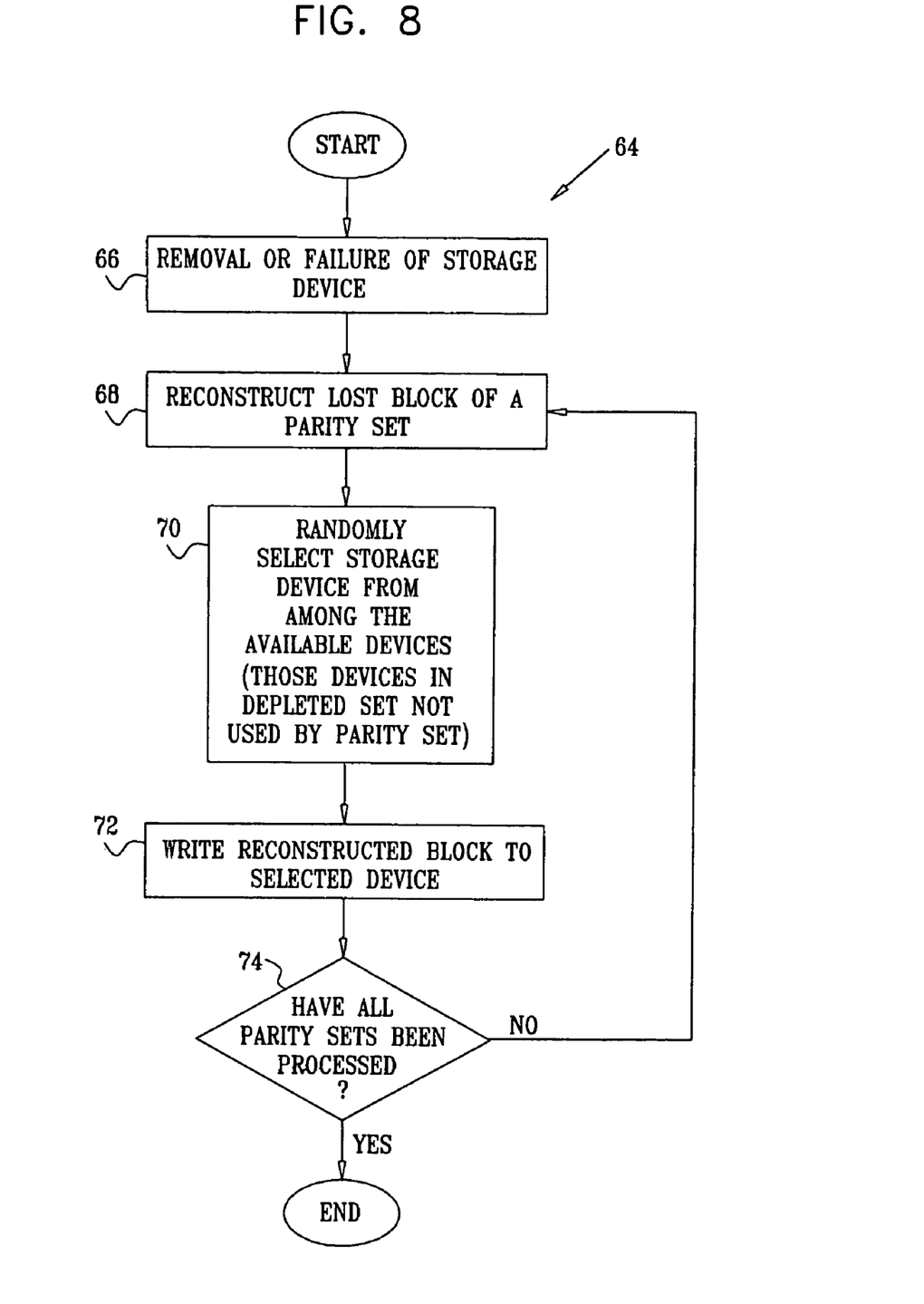
FIG. 8 is a flowchart of a process used for reconstruction and redistribution of data blocks when a storage device is removed from the storage system of FIG. 1, in accordance with an embodiment of the present invention.

FIG. 8 is a flowchart of a process 64 used for reconstruction and redistribution of data blocks when a storage device is removed from the storage system of FIG. 1, in accordance with an embodiment of the present invention. Removal of a device is to be understood as meaning physical removal of a device, performed intentionally or unintentionally, or a "virtual" removal that occurs when a disk fails or when the data on the device becomes otherwise unavailable. In the specification and in the claims, the term surplus device is to be taken to include a device that is physically or a virtually removed. Process 64 is applied by CPU 28 for all parity sets wherein a block becomes unavailable due to removal of a surplus device.

In a first step 66, a surplus device of storage devices 30 is removed from system 22. CPU 28 recognizes the removal, and begins reconstructing blocks that were on the lost device. In a step 68, a lost block of a parity set is reconstructed by XOR-ing the remaining blocks of the parity set. Next, in a step 70, a random selection is made between the available devices, that is, the devices that do not currently contain blocks of the parity set.

In a step 72, the reconstructed block is written to the selected device. As indicated by a step 74, process 64 continues iteratively until all parity sets having lost blocks have been processed, at which point process 64 terminates.

In an alternate embodiment, the randomizing process of step 70 uses a consistent hashing function, such as that referred to above. The consistent hashing function may advantageously be used if blocks in storage devices 30 have been allocated using the function. Use of the hashing function ensures that blocks effectively distributed from the surplus device will be redistributed to this device if it is subsequently replaced in the set of storage devices.

Figure 9A:
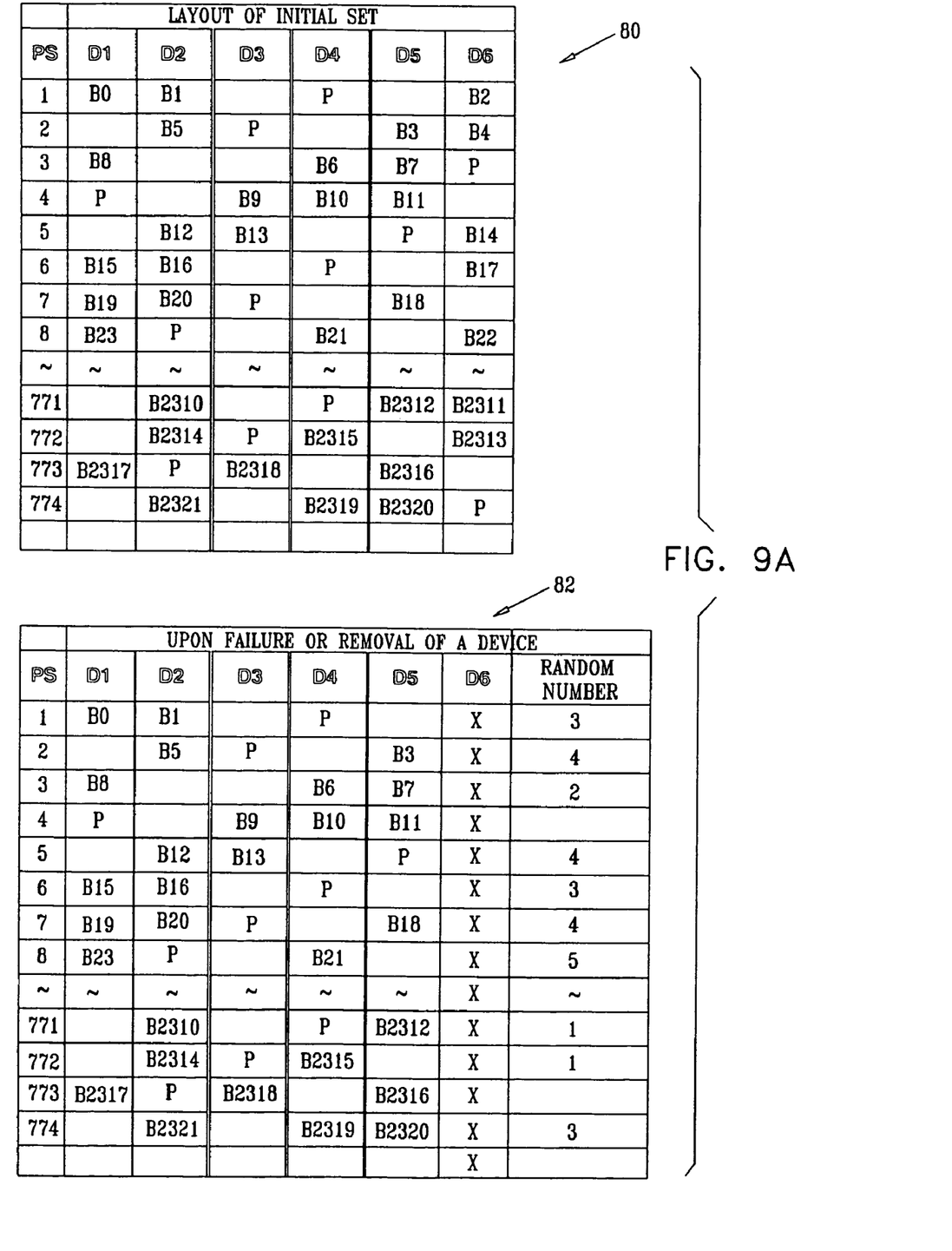
FIG. 9A and FIG. 9B are schematic diagrams illustrating a redistribution generated by the process of FIG. 8, in accordance with an embodiment of the present invention.
Figure 9B:
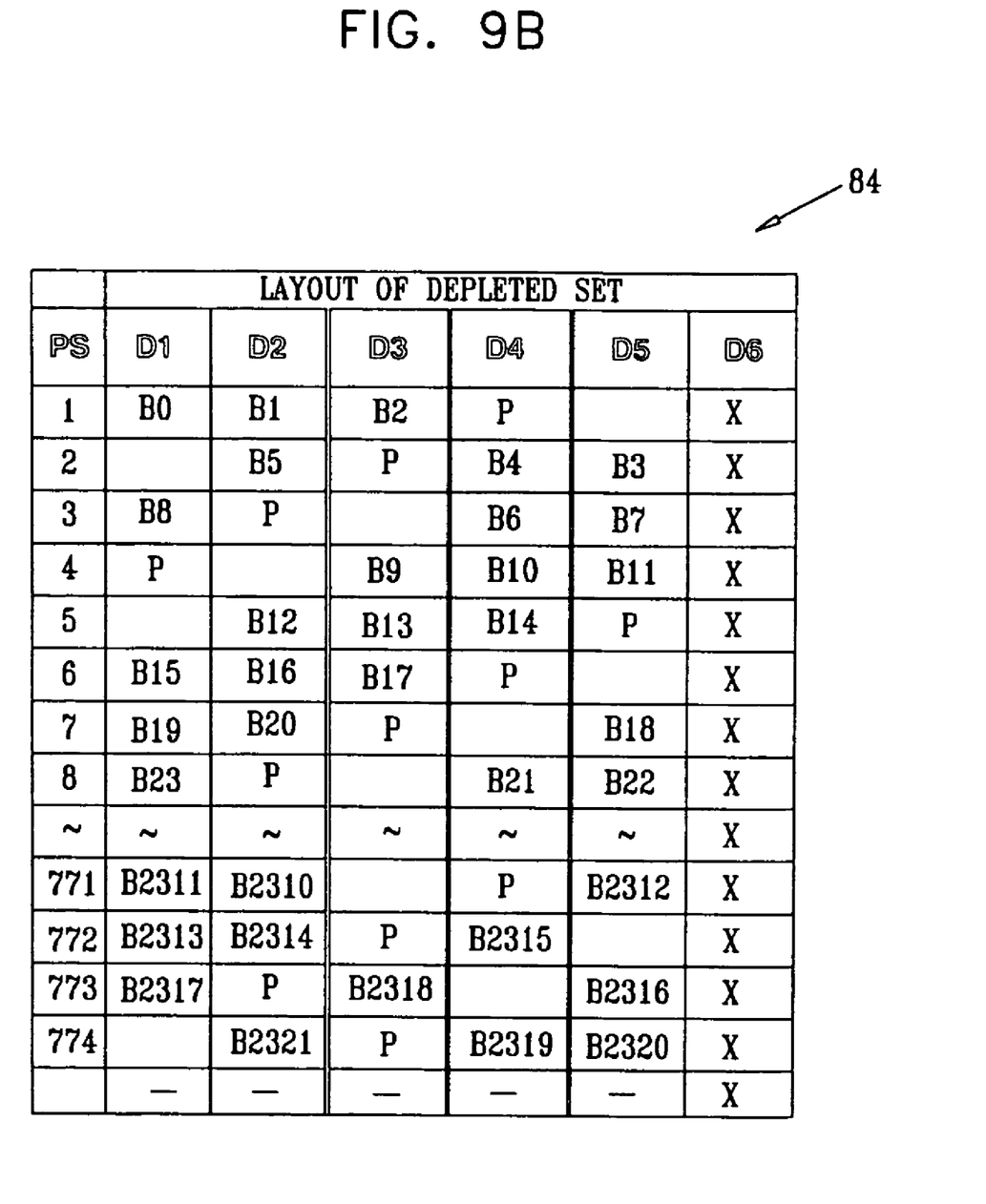

FIG. 9A and FIG. 9B are schematic diagrams illustrating a redistribution of data blocks when a storage device is removed from the storage system of FIG. 1, in accordance with an embodiment of the present invention. The redistribution is assumed to be applied by CPU 28 operating process 64 (FIG. 8). In the example illustrated, storage device D6 is removed from an initial set 80 in FIG. 9A. The initial set in this example has the same distribution as extended set 50 of FIG. 5; for clarity, in FIG. 9A the blocks on devices 30 are listed according their parity set.

After the removal or failure of a device, there are (N−1) remaining devices in the depleted set, as shown in a table 82. Because the parity sets comprise (N−1) or fewer blocks, there are still sufficient storage devices after the failure to allow each block of a parity set to be distributed to a different storage device, thereby preserving parity protection. In the example herein, the depleted set comprises five devices, which means that for any parity set that has lost a block, three devices will already be used by the remaining parity set blocks and two devices will be available for storing the fourth block, which must be reconstructed.

The results of applying process 64 to the random distribution of each reconstructed block are shown in table 82. For example, block B2, which was in parity set 1, was lost when device D6 was removed. The randomization process selects between available devices D3 and D5, using random numbers 3, 5, corresponding to the devices. As shown in table 62, random number 3 shows that device D3 was selected. For parity set 3 where the parity block was lost, CPU 28 selects between available devices D2 and D3. In this case device D2 was selected. It will be understood that CPU 28 does not apply process 64 to parity sets, such as PS4, that have not lost blocks in the removal of device D6. The final distribution of blocks across the depleted set is shown in a table 84 of FIG. 9B.

Returning to FIGS. 5 and 6, it will be understood that the consistent hashing function may have been used to generate the distribution illustrated in FIG. 5, and to generate the redistribution of FIG. 6. In this case, application of process 64, using the consistent hashing function in step 70, recovers the distribution of FIG. 5 if device D6 is removed.

From consideration of process 64 (FIG. 8), and by inspection of the exemplary results of the process shown in FIGS. 9A and 8B, it will be appreciated that, on removal of a storage device from an initial set of storage devices, process 64 causes substantially no transfer of data between the devices of the depleted set.

Typically, while reconstruction and reallocation is proceeding, according to the processes described above with reference to FIGS. 7 and 8, CPU 28 handles any attempts to read lost blocks by reconstructing and immediately reallocating the desired block, thereby avoiding the need to reconstruct any block more than once.

The present invention enables a storage system to quickly and automatically restore normal performance levels after a disk failure. The present invention also enables, on subsequent addition of additional storage devices, restoration of the original distribution of blocks. Furthermore, the ability to add devices, singly if required, or to remove devices, while maintaining a balanced distribution of parity and data blocks, means that embodiments of the present invention provide a storage system that is efficiently scalable. The ability to add devices also ensures that a storage system can also maintain a storage capacity buffer needed to recover after failure.

It will be understood that variations on the processes described above, for example comprising multiple combinations of storage systems and storage devices, are possible. These additional methods will be apparent to those skilled in the art, and all such methods are assumed to be within the scope of the present invention.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

We claim:

1. A method for distributing data over a set of N storage devices, wherein N is an integer greater than two, the method comprising:
    apportioning the data into multiple groups, each group consisting of one to (N−2) blocks of data;
    for each group, calculating a single parity block, so as to form a parity set of the blocks comprising the one to (N−2) blocks of data and the single parity block; and
    distributing the blocks of each parity set over the N storage devices so that every storage device stores both parity blocks and data blocks, while for each parity set each of the blocks in the parity set is stored on a different storage device and at least one of the N storage devices stores none of the blocks in the parity set,
    wherein distributing the blocks comprises distributing the single parity blocks among the N storage devices so that there is a balanced distribution of the parity blocks across the devices;
    adding one or more storage devices to the N storage devices, thus forming an extended set of the storage devices; and
    redistributing the blocks among the storage devices in the extended set so as to cause a portion of the blocks stored on the N devices to be redistributed to the one or more additional storage devices, while maintaining the balanced distribution and while ensuring that every storage device in the extended set stores both parity blocks and data blocks, while for each parity set each of the blocks in the parity set is stored on a different storage device and at least one of the storage devices in the extended set stores none of the blocks in the parity set, and without requiring a transfer of blocks between the storage devices in the N devices.

2. The method according to claim 1, wherein redistributing the blocks comprises applying a consistent hashing function to determine the blocks that will be redistributed from the set of N storage devices to the extended set.

3. The method according to claim 1, wherein redistributing the blocks comprises implementing a randomizing process to determine the blocks that will be redistributed from the set of N storage devices to the extended set.

4. A method for distributing data over a set of N storage devices, wherein N is an integer greater than two, the method comprising:
    apportioning the data into multiple groups, each group consisting of one to (N−2) blocks of data;
    for each group, calculating a single parity block, so as to form a parity set of the blocks comprising the one to (N−2) blocks of data and the single parity block; and
    distributing the blocks of each parity set over the N storage devices so that every storage device stores both parity blocks and data blocks, while for each parity set each of the blocks in the parity set is stored on a different storage device and at least one of the N storage devices stores none of the blocks in the parity set,
    wherein distributing the blocks comprises distributing the single parity blocks among the N storage devices so that there is a balanced distribution of the parity blocks across the devices;
    removing a surplus device from the N storage devices, thus forming a depleted set of storage devices;
    for each block on the surplus device, reconstructing the block by XOR-ing remaining blocks of the parity set of the block, so as to form a reconstructed block; and
    redistributing the reconstructed blocks among the storage devices in the depleted set so as to cause the reconstructed blocks to be reallocated to the depleted set, while maintaining the balanced distribution and while ensuring that every storage device in the depleted set stores both parity blocks and data blocks, while for each parity set each of the blocks in the parity set is stored on a different storage device and at least one of the storage devices in the depleted set stores none of the blocks in the parity set, and without requiring a transfer of blocks among the storage devices in the depleted set.

5. The method according to claim 4, wherein redistributing the reconstructed blocks comprises applying a consistent hashing function to distribute the reconstructed blocks to the depleted set.

6. The method according to claim 4, wherein redistributing the reconstructed blocks comprises implementing a randomizing process to distribute the reconstructed blocks to the depleted set.

* * * * *